US005676506A

United States Patent [19]

Sugata

[11] Patent Number: 5,676,506

[45] Date of Patent: Oct. 14, 1997

[54] SPINDLE DEVICE FOR MACHINE TOOLS

[75] Inventor: Shinsuke Sugata, Fukuyama, Japan

[73] Assignee: Horkos Corp., Hiroshima-ken, Japan

[21] Appl. No.: 696,194

[22] Filed: Aug. 13, 1996

[30] Foreign Application Priority Data

Aug. 30, 1995 [JP] Japan .................................... 7-259174

[51] Int. Cl.[6] ................................ B23C 9/00; B23B 27/10

[52] U.S. Cl. ................................................ 409/136; 408/59

[58] Field of Search .................................... 409/136, 134; 184/6.14, 6.26, 55.1; 408/59, 56

[56] References Cited

U.S. PATENT DOCUMENTS

| | | | |
|---|---|---|---|
| 3,478,843 | 11/1969 | Eckardt | 184/6.26 |
| 3,561,299 | 2/1971 | Brisk et al. | 408/59 |
| 3,868,195 | 2/1975 | Anderson et al. | 184/6.26 |
| 5,086,878 | 2/1992 | Swift | 408/56 |

FOREIGN PATENT DOCUMENTS

| | | | |
|---|---|---|---|
| 126793 | 12/1984 | European Pat. Off. | 408/59 |
| 332328 | 9/1989 | European Pat. Off. | 408/59 |
| 1298045 | 3/1987 | U.S.S.R. | 409/136 |
| 1344579 | 10/1987 | U.S.S.R. | 409/136 |
| 14845911 | 6/1989 | U.S.S.R. | 409/136 |
| 1537468 | 1/1990 | U.S.S.R. | 409/136 |
| 2130931 | 6/1984 | United Kingdom | 408/59 |

*Primary Examiner*—William R. Briggs
*Attorney, Agent, or Firm*—Lane, Aitken & McCann

[57] ABSTRACT

It is possible to effectively supply mist to a machining point in a case of machining a comparatively deep point in a workpiece. For this purpose, two supply systems s1,s2 are provided to supply air and coolant separately into the spindle 1, and a mist generating device 33 which is able to jet mist by mixing air and coolant which are supplied through these supply systems is provided in the front edge of the spindle 1 or in the tool holder 8.

5 Claims, 15 Drawing Sheets

SPINDLE DEVICE FOR MACHINE TOOLS

BACKGROUND OF THE INVENTION

1. Field of the Invention

The present invention relates to a spindle device for machine tools, having a mist generating device provided in a spindle.

2. Prior Arts

In machining by a machine tool, a great deal of coolant is supplied to a machining point of a workpiece in order to cool down and lubricate the workpiece and a tool or to eliminate cutting chips. In this case, there are various problems such as environmental pollution due to coolant, adverse influence on human health, cost increase in line with treatment of waste coolant, lowering of the life of tools due to excessive cooling of workpieces, frictional wearing in fine infeed cutting by a tool due to excessive coolant, etc. In addition, there are still other problems, for example, a large cost increase in treatment since it is necessary to separate coolant from cutting chips when re-utilizing the cutting chips.

In order to solve these problems, recently, such a method in which a remarkably small amount of coolant is made mist and the mist coolant is supplied to a machining point of a workpiece has been employed.

Concretely, for example, as shown in FIG. 1 and FIG. 2, mist m of coolant is jetted to a machining point of a workpiece from the vicinity of a tool 2 fixed at the front edge of spindle 1 through a mist supply pipe 3 secured in the vicinity of said tool 2. At this time, 4 is a mist generating device spaced from said spindle 1, 5 is a head member which rotatably surrounds said spindle 1, 6 is a pulley for transmission rotations to said spindle 1, 7 is a drive unit which pushes, pulls and dislocates a draw bar 9 for fixing and releasing a tool holder 8, and w is a workpiece.

In a conventional means shown in FIG. 1 and FIG. 2, which was described above, for example, in a case where a machining point is located at a comparatively deep position of a workpiece w such as, for example, in drilling, it will not be possible for the mist m to be introduced to the machining point since the same is interrupted by the workpiece w itself, tool 2, cutting chips, etc. Therefore, the machining point will not be sufficiently cooled down nor lubricated. Resultantly, not only can efficient machining not be carried out but also the machining itself will be impossible.

As a method for attempting to solve this, as shown in FIG. 3, it is considered that mist m is supplied through an inlet 10*a* of a mist supply path means secured around a tool holder 8, and said mist m is supplied to the machining point through a path 2*a* formed at the axial core of tool 2.

However, according to the method described above, since the tool holder 8 and tool 2 are caused to rotate together with the spindle 1 during machining, the mist m supplied through the inlet 10*a* is given a centrifugal force when the same flows from the outside to the rotation center in a path 8*a* in the radius direction of the same holder 8, and the flow of mist m is influenced by said centrifugal force, whereby the mist m is not uniformly supplied to the machining point at a stabilized density. That is, although the mist m which reaches inside the tool holder 8 is in such a state that air and coolant are uniformly mixed, coolant whose specific gravity is large is biased outwardly in the radius direction and air whose specific gravity is small is biased inwardly in the radius direction while the same is passing through the path 8*a*, whereby air and liquid are separated from each other. Therefore, mist having little coolant and mist having much coolant are irregularly supplied to a workpiece.

As another trial, as shown in FIG. 4, it is considered that a rotary joint 11 of a fluid path is provided at the rear part of the spindle 1, mist m is supplied through an inlet 11*a* thereof and is further supplied to the machining point via paths 1*a*,8*b*,2*a* formed at the spindle 1, tool holder 8 and tool 2.

However, according to the above method, since the spindle 1, tool holder 8 and tool 2 are caused to rotate during machining, the mist m supplied inside the spindle 1 is influenced by receiving a centrifugal force while the same is passing through a long path from the rear part of the spindle 1 to the front edge of the tool 2 and is divided into air and coolant as described above, whereby similar problems may be caused.

It can not be achieved by only supplying mist to conventionally existing devices that the mist m is effectively supplied to a comparatively deep point of a workpiece w as described above. A device able to achieve this is desired. It is therefore an object of the invention to provide a spindle device for machine tools which is able to satisfy such a desire.

According to the invention constructed as described above, it is possible to sufficiently supply mist m in a case of machining a comparatively deep point in a workpiece and possible to obtain advantages of a machining method in which mist is supplied, without any hindrance.

According to the invention, since air is directly supplied from the supply path to the mist jetting side 6*f* a mist generating device via a bypass path in a case where the mist pressure is made lower in a path in a tool resulting from the tool size being large, the mist stream in a path in the tool is strengthened, and it is possible to sufficiently supply mist to a machining point.

According to the invention, it is possible to immediately interrupt supply of coolant to a mist generating device when interrupting coolant supply to the spindle in order to stop the mist supply, and possible to prevent residual coolant, for example, in a supply path, from leaking thereafter.

SUMMARY OF THE INVENTION AND ADVANTAGES

In order to achieve the above object, according to the invention, two supply path systems which are able to separately supply air and liquid into a spindle are provided, and at the same time a mist generating device which is able to supply and jet air and liquid which are supplied by these supply paths is provided in the front edge of the spindle or in the tool holder.

In order to allow a spindle head according to the invention to be used regardless of the degree of necessary quantity of mist, a bypass path is provided to cause an air supply path and the mist jetting side space of the mist generating device to communicate with each other, and simultaneously an opening and closing valve mechanism which is maintained to be open only when the pressure of the mist generated by the mist generating device is less than a fixed pressure level is provided halfway along said path.

In a case where it is attempted that the mist supply stops, a stop valve which is maintained to be closed when the liquid pressure is less than a fixed pressure level is provided immediately before the mist generating device which is the termination of the liquid supply path in order to prevent liquid leakage from the mist generating device from occurring.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF PREFERRED EMBODIMENTS

In all the drawings attached to this specification, parts which are substantially identical to those in the respective drawings are given the same reference numbers in order to simplify the description of the invention.

Figure 1:
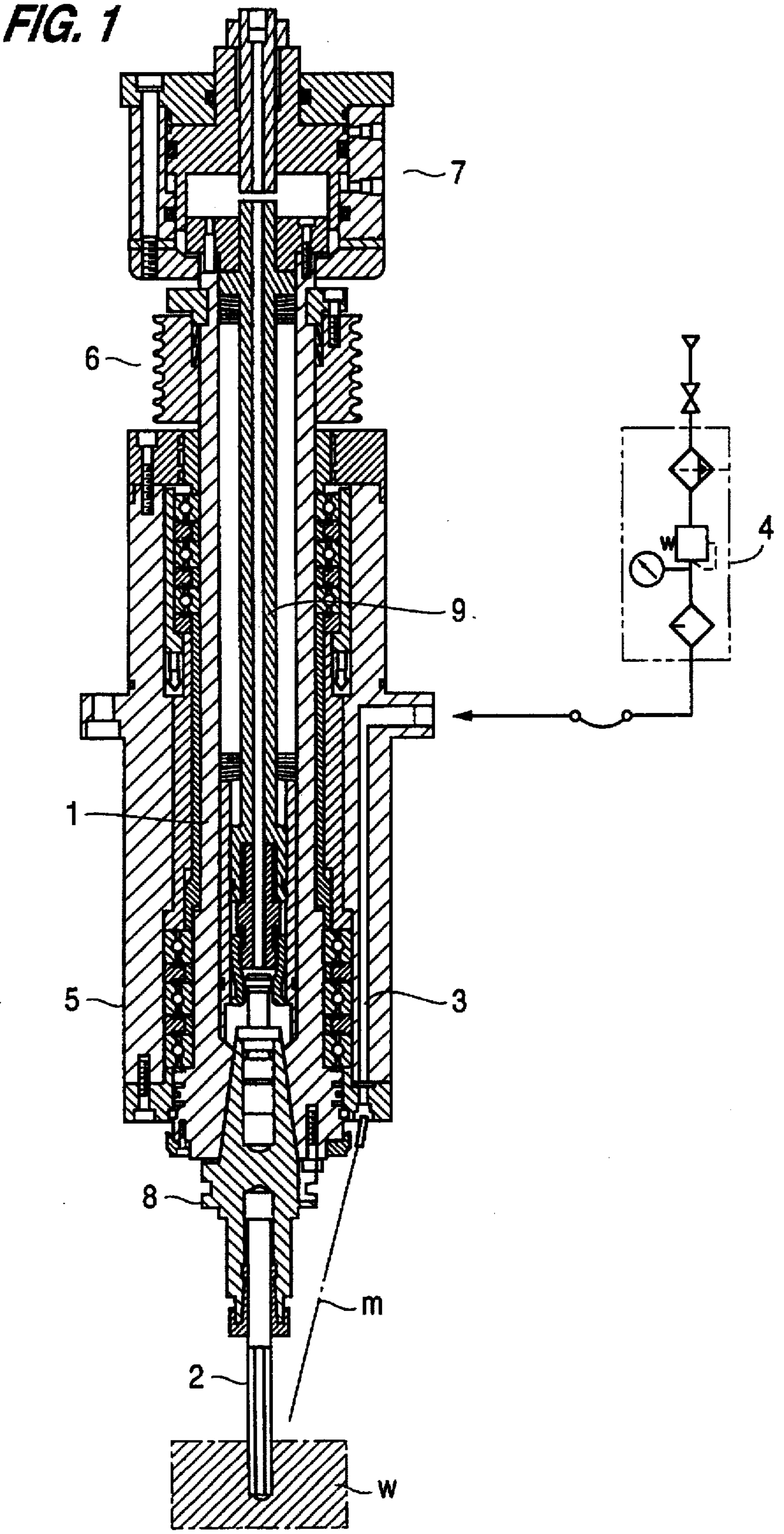
FIG. 1 is a longitudinally sectional view showing the spindle head portion of a conventional machine tool.
Figure 2:
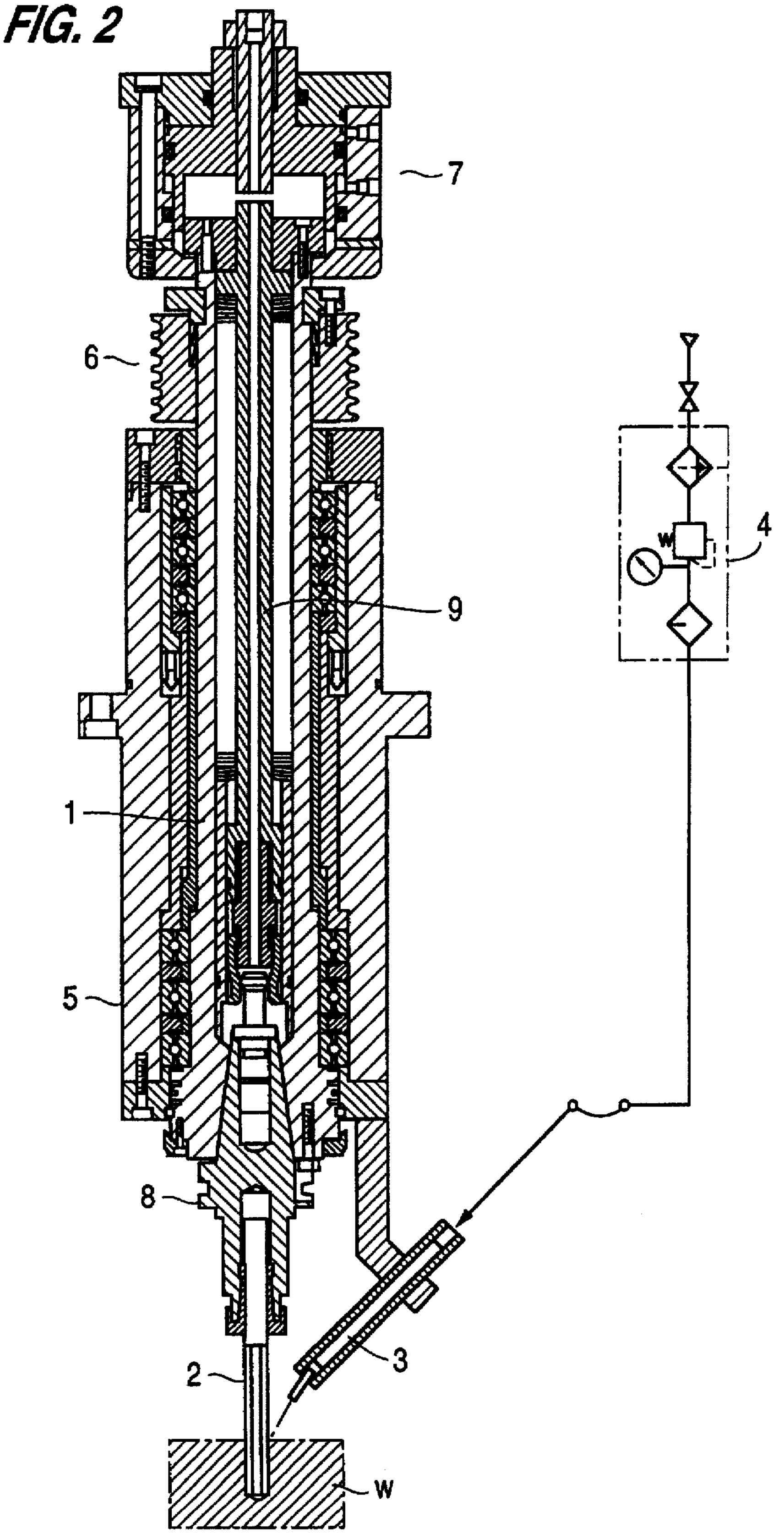
FIG. 2 is a longitudinal sectional showing the spindle head portion of another conventional example.
Figure 3:
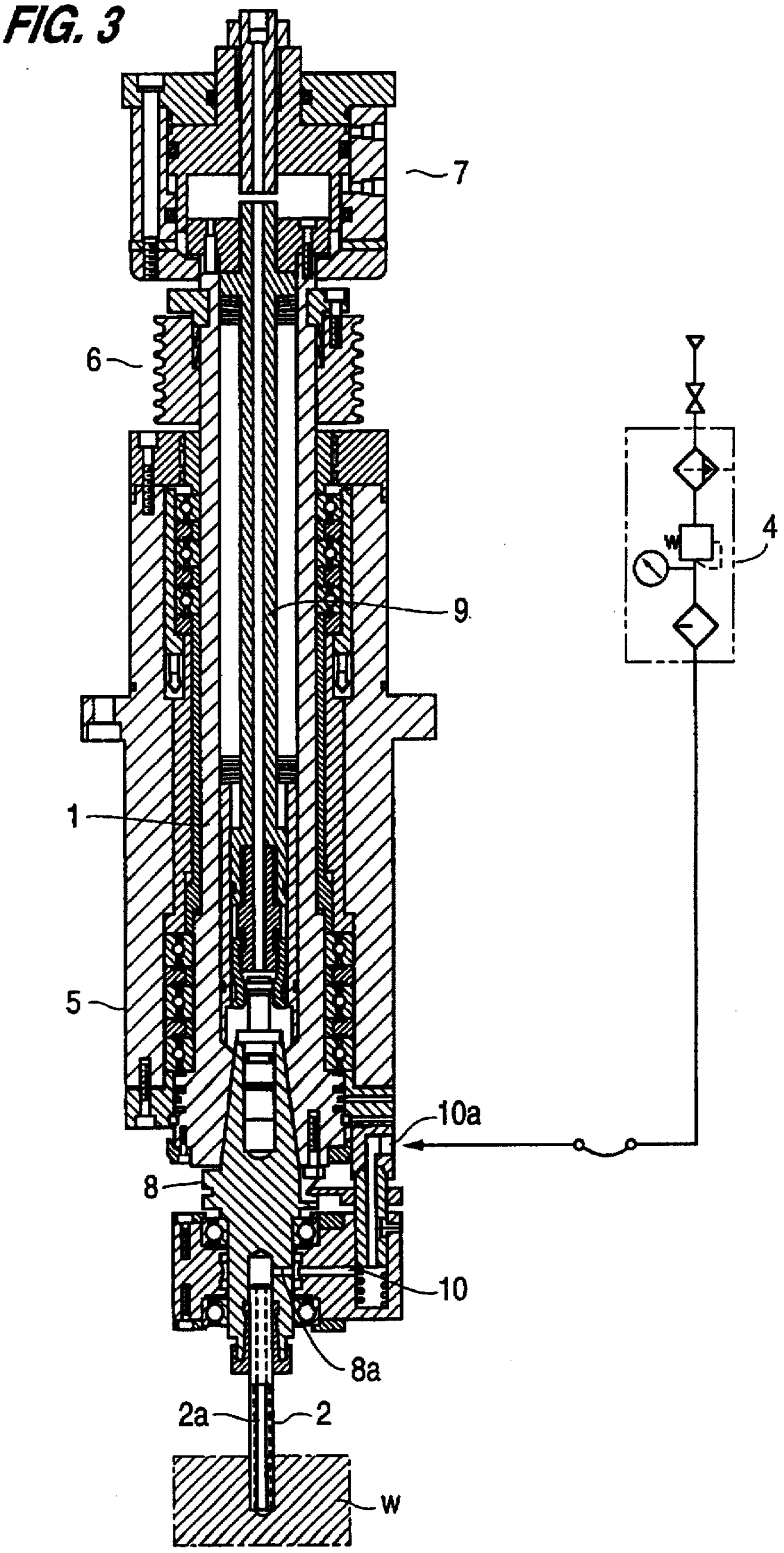
FIG. 3 is a longitudinal sectional view showing the spindle head portion of still another conventional example.
Figure 4:
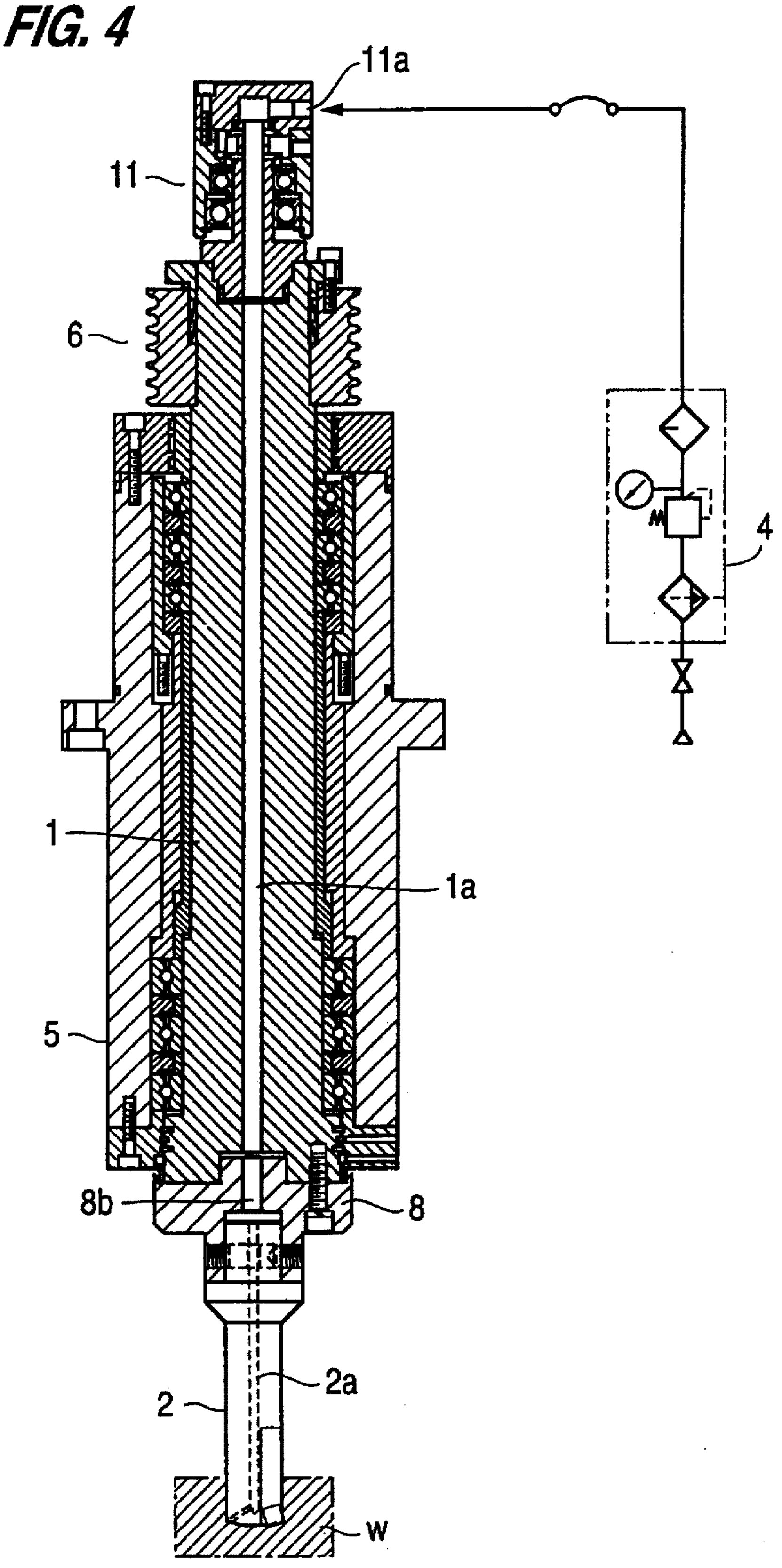
FIG. 4 is a longitudinal sectional view showing the spindle head portion of a further conventional example.
Figure 5:
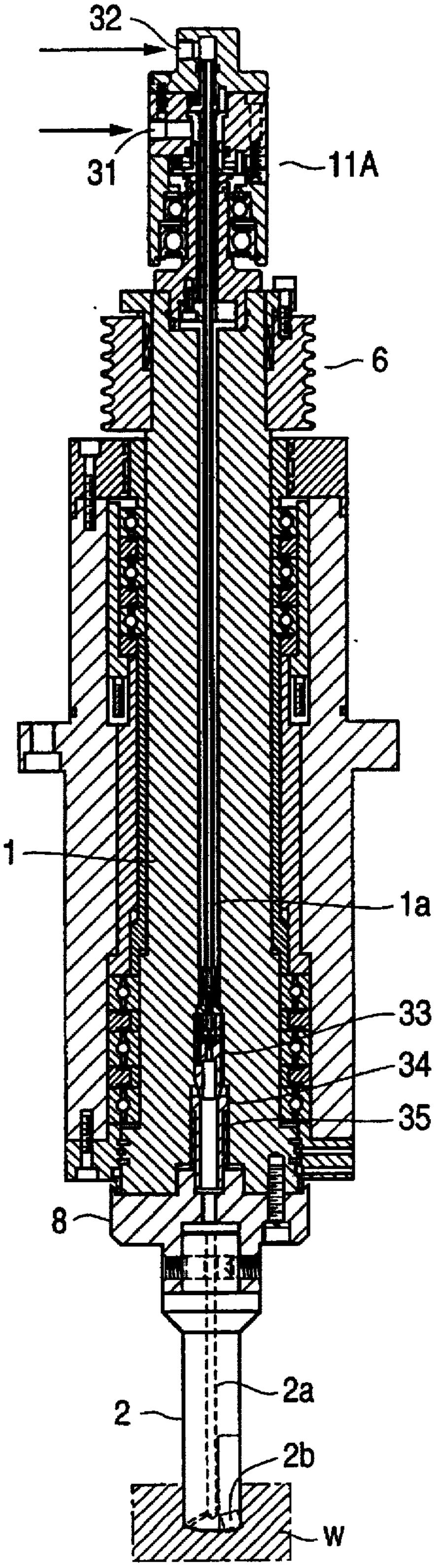
FIG. 5 is a longitudinal sectional view showing the spindle head portion according to a first preferred embodiment of the invention.

Firstly, a description is given of a first preferred embodiment of the invention. FIG. 5 is a longitudinally sectional view of a spindle head of a machine tool.

Figure 6:
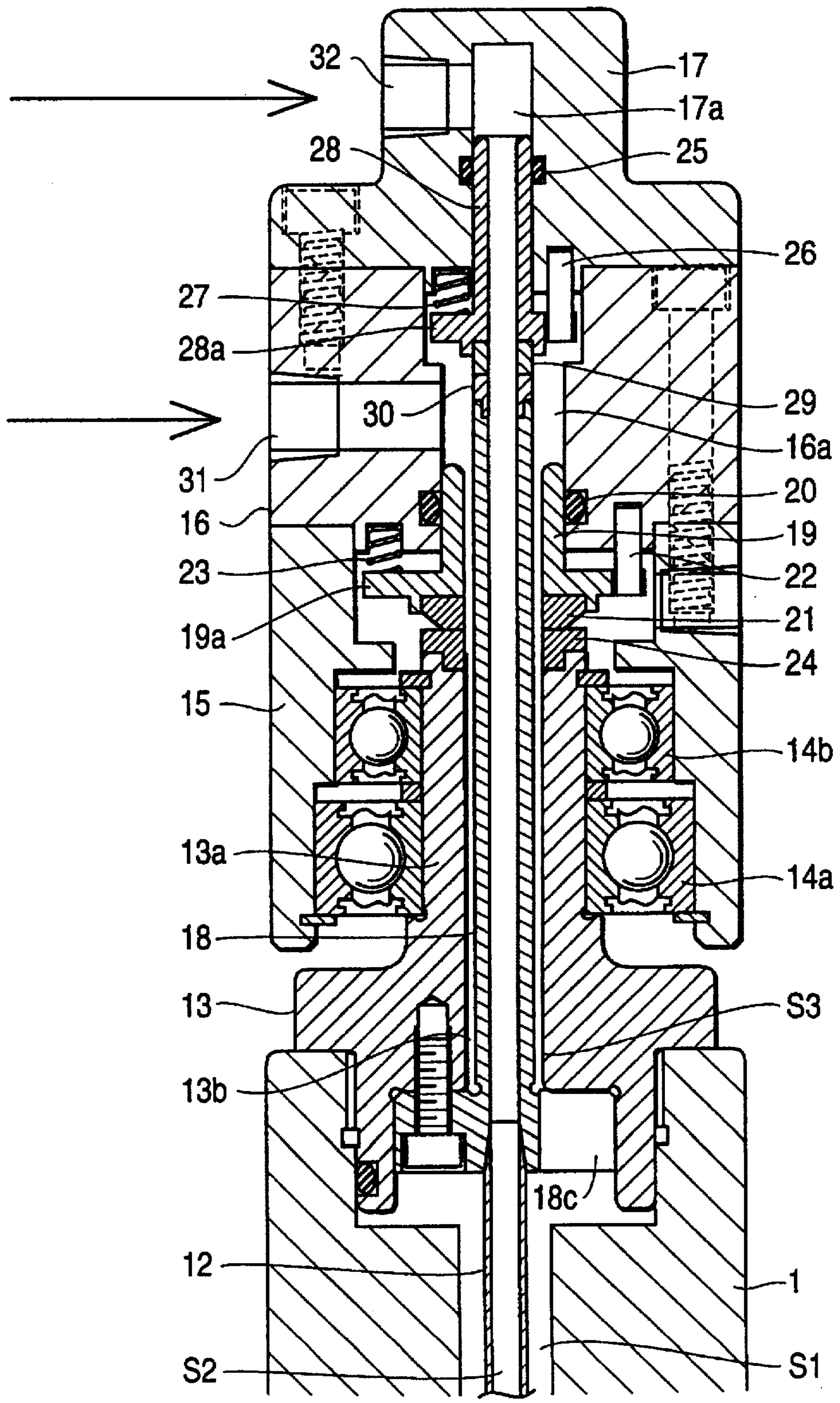
FIG. 6 is an enlarged longitudinally sectional view showing the upper part of the spindle head portion of the same preferred embodiment.

As shown in the drawing, an inner pipe 12 is concentrically provided in an inner opening 1*a* of spindle 1, and the inside of the inner opening 1*a* is divided into two systems, one of which is an outside path s1 and the other of which is an inside path s2 while making the wall face of the inner pipe 12 a boundary therebetween as shown in FIG. 6, wherein the outside path s1 is an air supply path and the inside path s2 is a coolant supply path.

A rotary joint 11*a* of a fluid path is fixed at the rear part of the spindle 1. Correctly, it is constructed as shown below.

That is, a staged axial cylindrical member 13 is extendingly screwed in at the rear end face of the spindle 1, an outer cylindrical member 15 is fitted to the upper diameter-reduced part 13*a* thereof via bearings 14*a*,14*b*, and at the same time an intermediate cylindrical member 16 and covering member 17 are fixed at an outer cylindrical member 15, wherein an inner tubular member 18 is fixed with a bolt in the inner opening 13*b* of said axial cylindrical member 13 concentrically therewith, an outer path s3 at the wall face of the inner tubular member 18 is caused to communicate with said supply path s1 via a notched portion 18*c* and an inner path s4 is caused to communicate with said supply path s2 by connecting the upper end of said inner pipe 12 to the lower end of said inner tubular member 18. A cylindrical sliding member 19 is liquidtightly inserted into the inner opening 16*a* of an intermediate member 16 by an O ring 20. Said cylindrical sliding member 19 has a flanged part 19*a*. A sliding ring body 21 is fixed at the front end thereof, is able to advance and retreat in the spindle 1 direction via a guide rod 22 fixed at said intermediate member 16 and is pressed to the spindle 1 side by a spring 23. A sliding ring body 24 in which said sliding ring body 21 is pressed to and brought into contact with the upper end face of said diameter-reduced part 13*a* of the axial cylindrical member 13 is fixed thereat. Still furthermore, a comparatively small sliding cylindrical member 28 is inserted into and fitted to the inner hole 17*a* of the covering member 17 via an O ring 25, guide rod 26 and spring 27 so that operations corresponding to said sliding cylindrical member 19 can be obtained. A sliding ring body 29 is fixed at the front side of the flanged portion 28*a* thereof, and a sliding ring body 30 in which said sliding ring body 29 is pressed to and brought into contact with the upper end face of said inner tubular member 18 is also fixed thereat. 31 is a support port for supplying air into the inner hole 16*a* of the intermediate member 16, and 32 is a supply port for supplying coolant into the inner hole 17*a* of the covering member 17.

In this rotating joint 11A, the outer cylindrical member 15, intermediate member 16 and covering member 17 are supported in a non-rotating state, and the staged axial cylindrical member 13 and inner tubular member 18 are constructed so as to rotate integrally with the spindle 1.

While they are in operation, the sliding ring body 21 and sliding ring body 24 are caused to relatively rotate in an under-pressure contacted state, liquidtight state. Simultaneously, the sliding ring body 29 and sliding ring body 30 are caused to relatively rotate in a state similar to the above. Therefore, even though the spindle 1 is rotating, air supplied from the supply port 31 reaches inside the supply path s1, passing through the inner hole of the sliding cylindrical member 19 and the inner hole 13*b* of the axial cylindrical member 13, and the coolant supplied by the supply port 32 reaches inside the other supply path s2, passing through the inner hole of the sliding cylindrical member 28 and the inner tubular member 18.

A mist generating device 33 is provided at the front edge center part of spindle 1. A detailed description thereof is given below.

Figure 7:
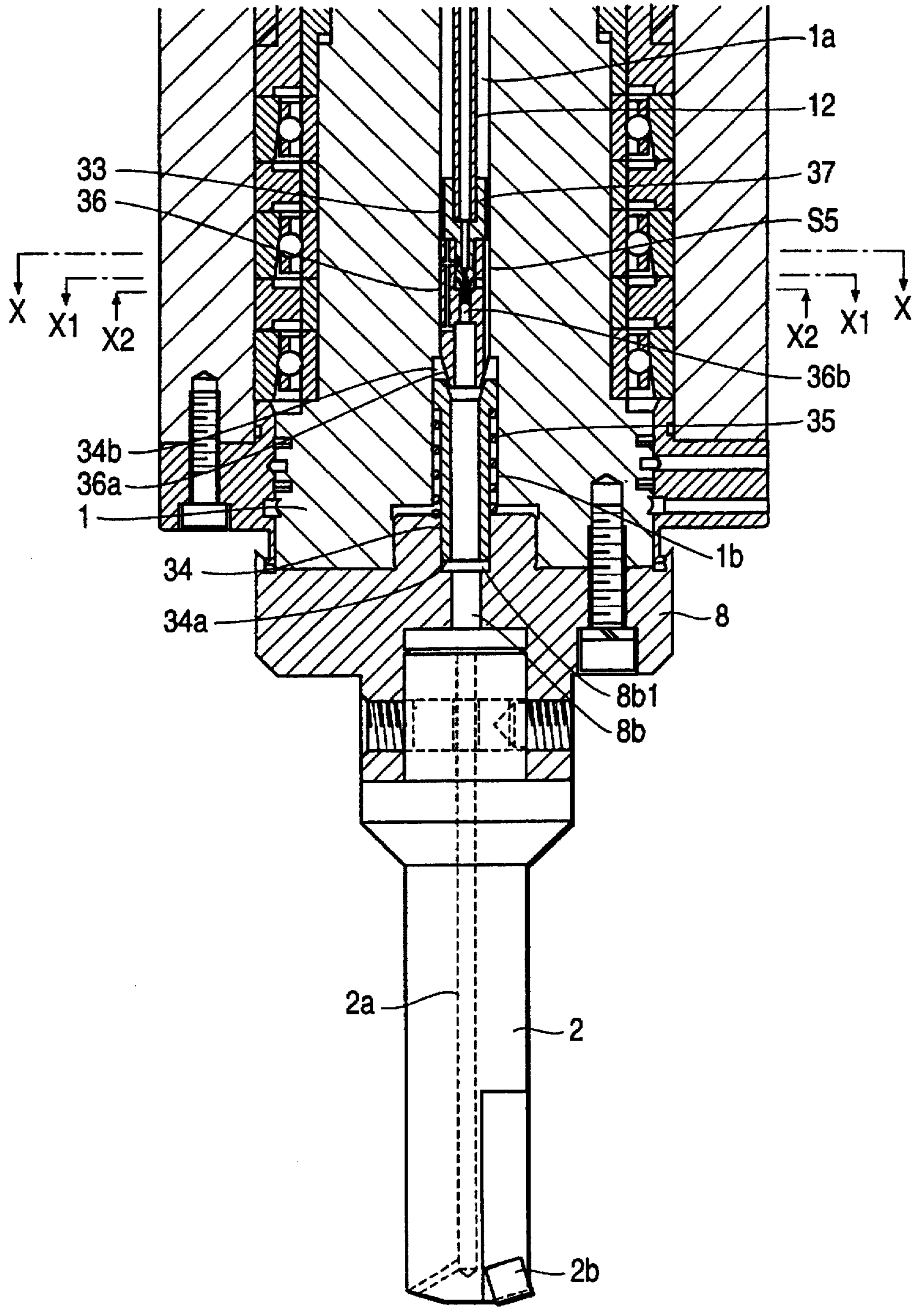
FIG. 7 is an enlarged longitudinally sectional view showing the lower part of the spindle head portion of the same preferred embodiment.
Figure 8A:
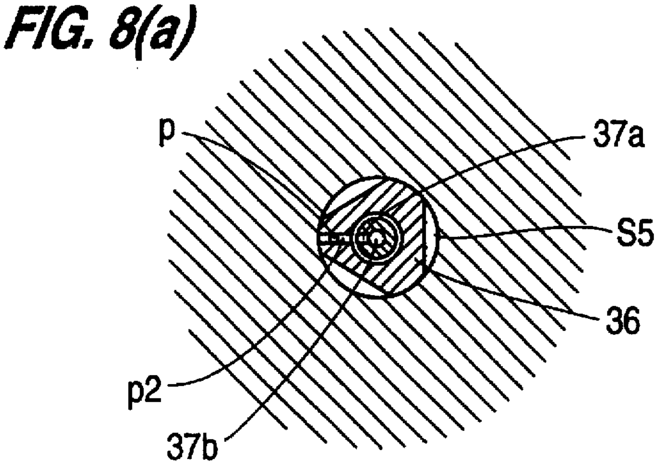
FIG. 8 shows the center part of the spindle shown in FIG. 7, wherein (a) is a cross-sectional view taken along the line x—x, (b) is a cross-sectional view taken along the line 1x—1x, and (c) is a cross-sectional view taken along the line 2x—2x.
Figure 8B:
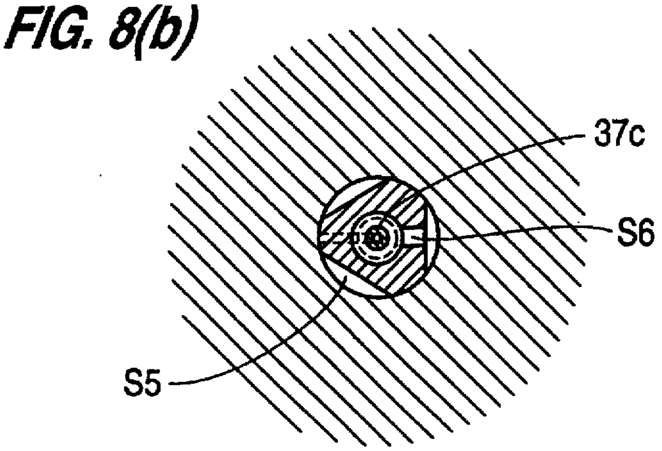
Figure 8C:
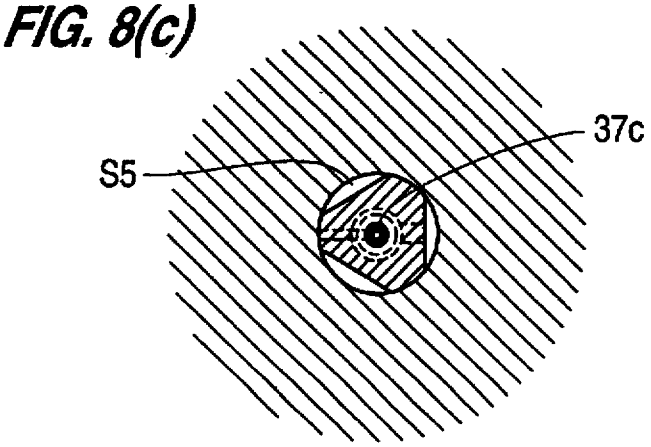
Figure 9:
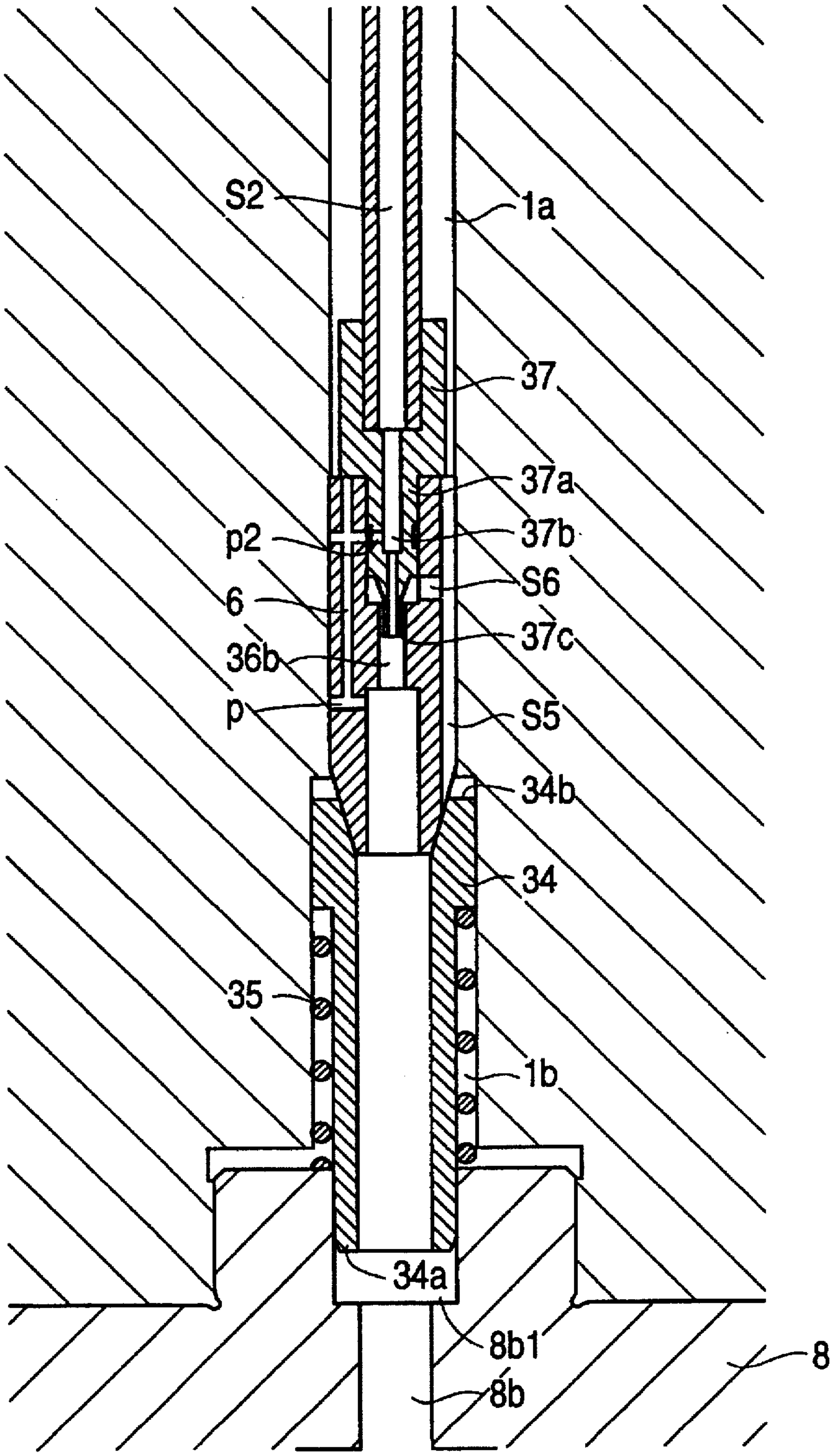
FIG. 9 is a longitudinally sectional view showing the periphery of a mist generating device of the same preferred embodiment.

That is, as shown in FIG. 7, a guide opening 1*b*, the diameter of which is somewhat consecutively swelled toward the front edge thereof is formed in the inner hole 1*a* of spindle 1, and a sliding cylindrical member 34 is inserted and fitted inwardly thereof so as to be displaceable in the spindle 1 direction. A compression spring 35 is fitted to the outer side of the diameter-reduced part at the outer circumferential face of said sliding cylindrical member 34. By one end thereof being supported on the upper end surface of tool holder 8, the sliding cylindrical member 34 is pressed upward by elasticity of said spring 35. On the other hand, a nozzle front member 36 is inserted into and fitted to the front end of the inner hole 1*a*, and simultaneously the nozzle rear member 37 inserted into and fixed to said member 36 is fixed at the front edge of the inner tube 12. Said nozzle front member 36 makes the surface of the front end outer circumferential face 36*a* conical, and simultaneously the cross section of the body part is made roughly triangular, as shown in FIG. 8, in order to form a path s5 in the spindle direction on the outer circumferential face of the body part. Furthermore, the nozzle front member 36 has a staged center hole 36*b* at its center part as shown in FIG. 9, and a communication path s6 is formed in order to cause the front side of said center hole 36*b* to communicate with said path s5. Furthermore, the thick wall part of the center hole 36*b* has a small hole path p which is for making the center hole 36*b* open to the circumferential face of the inner hole 1*a* and simultaneously for communicating with the communication path p2. Furthermore, the nozzle rear member 37 is constructed so that the diameter-reduced part 37*a* is fitted and fixed in the center hole 36*b* of the nozzle front member 36, an inner hole 37*b* is provided at the center part thereof, the upper end of said inner hole 37*b* is caused to communicate with the supply path s2, the front edge diameter-reduced protruding part 37*c* is positioned concentrically at the central diameter-reduced part, a path is formed at the outer circumference of said protruding part 37*c* and simultaneously a communication path p2 is formed into order to cause the inner hole 37*a* to communicate with the small hole path p.

The spindle holder 8 is fixed at the spindle 1 with a bolt, and a guide hole 8*b*1 which is continuous from the center path 8*b* and corresponds to said guide hole 1*b* is secured at the center part on the upper end face of said holder 8. The lower end of the sliding cylindrical member 34 is inserted into said guide hole 8*b*1 so as to be displaceable. The front end of a path 2*a* of a tool 2 is branched to a plurality and the branched edges are made open at the points where each tool edge 2*b* exists.

A description will be given of use examples and operation of a device according to the invention, which is constructed as shown above. When the device is started, rotations of a motor (not illustrated) are transmitted to the spindle 1 via a pulley 6, whereby air is supplied via a supply port 31 from a peripheral air supply line, and coolant is supplied via another supply path port 32 from a peripheral coolant supply line.

Thereby, air is jetted inwardly of the front edge of the center hole 36*b* from the outer circumference of the front edge diameter-reduced protruding part 37*c* through the communication path s6 after the same passes through an air path of the rotary joint 11A and the supply path s1, and coolant is also jetted inwardly of the front edge of the center hole 36*b* of the nozzle front member 36 from the center part of the front edge diameter-reduced protruding part 37*c* via the inner hole 37*b* after the same passes through a coolant path of the rotary joint 11A and supply path s2.

The air and coolant thus jetted are radically agitated and mixed in said center hole 36 and they are turned into mist.

At this time, in a case where it is assumed that the pressure of mist m in the path 2*a* is maintained to be higher than a fixed pressure related to the elasticity of a spring 35 since the size of tool 2 is comparatively small, this pressure acts on the front edge face 34*a* of the sliding cylindrical member 34 and presses the same member to the rearward of spindle 1. Therefore, the upper end opening of the inner hole of the same member 34 is pressed to the front edge outer circumferential face 36*a* of the nozzle front member 36 by a pressing force of the mist pressure and a pressing force of the spring 35, whereby the sliding cylindrical member 34 is maintained in the state shown in FIG. 9.

Therefore, mist m generated by the mist generating device 33 is, as it is, jetted from the vicinity of a tool edge 2*b* through the tool holder 8 and path 2*a* of the tool 2 after passing through the inner hole of the sliding cylindrical member 34.

In this condition, the spindle head part is moved downward as necessary in order to cause a tool 2 to machine a workpiece w. As this machining goes on, the tool edge 2*b* acts deep in the workpiece w. Even in this case, since mist m is able to be supplied directly to the tool edge 2*b*, the supply thereof is not interrupted due to cutting chips, etc., whereby the machining part is able to be sufficiently lubricated and cooled, and the device is able to to provide appointed functions.

On the other hand, in a case where the pressure of mist m in the path 2*a* is made lower than a fixed pressure when the size of a tool 2 is comparatively large, a force by which the sliding cylindrical member 34 is pressed backward of the spindle 1 on the basis of said pressure acting on the front edge 34*a* of said member 34 is made weaker, whereby a force toward the tool 2 side on the basis of the air pressure acting on the rear end face 34*b* of the sliding cylindrical member 34 through the path s5 of the nozzle front member 36 causes the same member 34 to be displaced toward the tool 2 side against a force of pressure 35 as shown in FIG. 7.

Thereby, the upper end opening of the inner hole of the sliding cylindrical member 34 is separated from the front edge outer circumferential face 36*a* of the nozzle front member 36, the supply path s1 and the mist jetting side space (inside the inner hole of the sliding cylindrical member 34) of the mist generating device 33 are caused to communicate with each other.

Therefore, air in the supply path s1 is caused to flow directly in the inner hole of the sliding cylindrical ember 34, passing between the upper end opening of the inner hole of the sliding cylindrical member 34 and the front edge outer circumferential face 36*a* of the nozzle front member 36 after the same passes through the path s5 and the upper part of the guide hole 1*b*. That is, in this embodiment, the path s5 and the upper part of the guide hole 1*b* function as a bypass path by which the supply path and the inner hole of the sliding cylindrical member 34 are caused to communicate with each other. Furthermore, the upper end opening of the inner hole of the sliding cylindrical member 34 and the front edge outer circumferential face 36*a* of the nozzle front member 36 function as an opening and closing valve which controls the flow of air.

As described above, the quantity of air flowing in the path 2*a* is increased, and a pressure lowering of the mist m is better compensated, whereby mist m is effectively supplied to a machining part and appointed effects are able to be accomplished.

Figure 10:
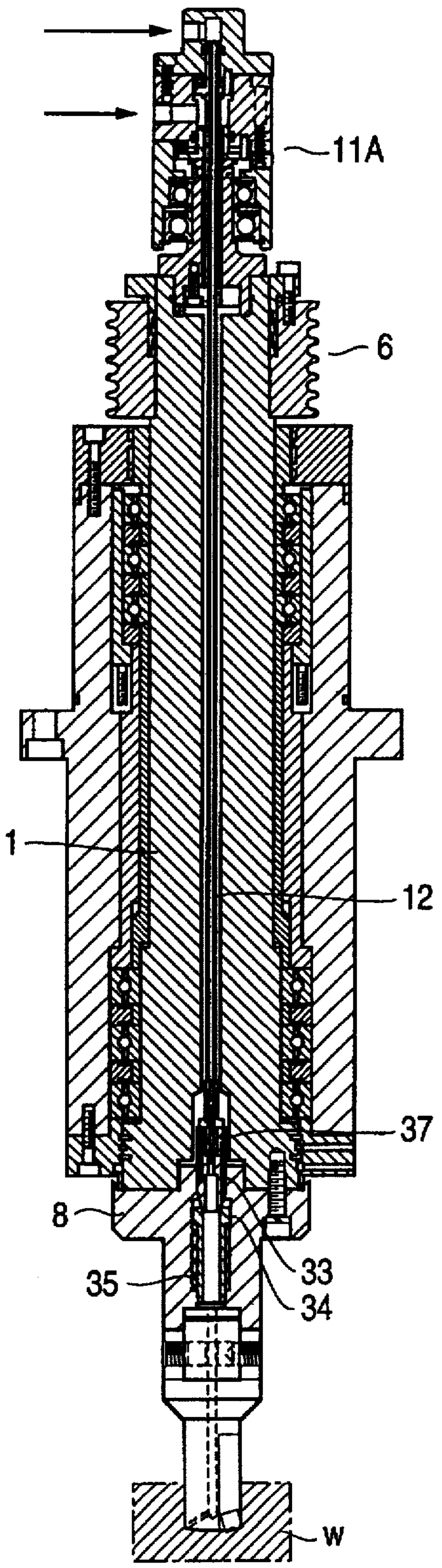
FIG. 10 is a longitudinally sectional view showing the spindle head portion according to a modified example of the same preferred embodiment.

In the abovementioned preferred embodiment, the mist generating device 33 and sliding cylindrical member 34 may also be provided inwardly of a tool holder 8 as shown in FIG. 10.

Figure 11:
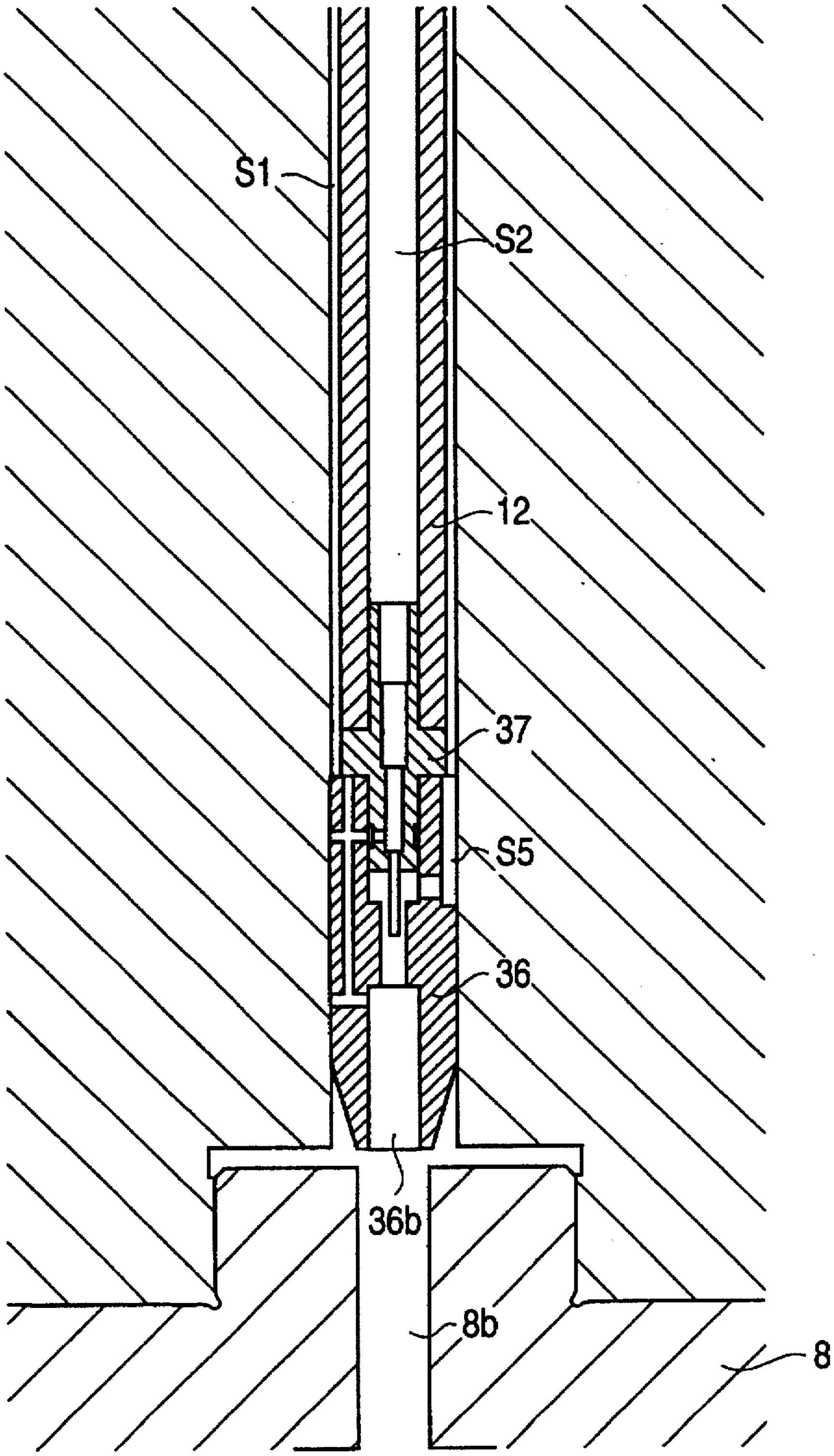
FIG. 11 is a longitudinally sectional view showing the spindle head portion according to a modified example of the same preferred embodiment.

Furthermore, a sliding cylindrical member 34 already described and a spring 35 related thereto may be omitted as shown in FIG. 11.

Figure 12:
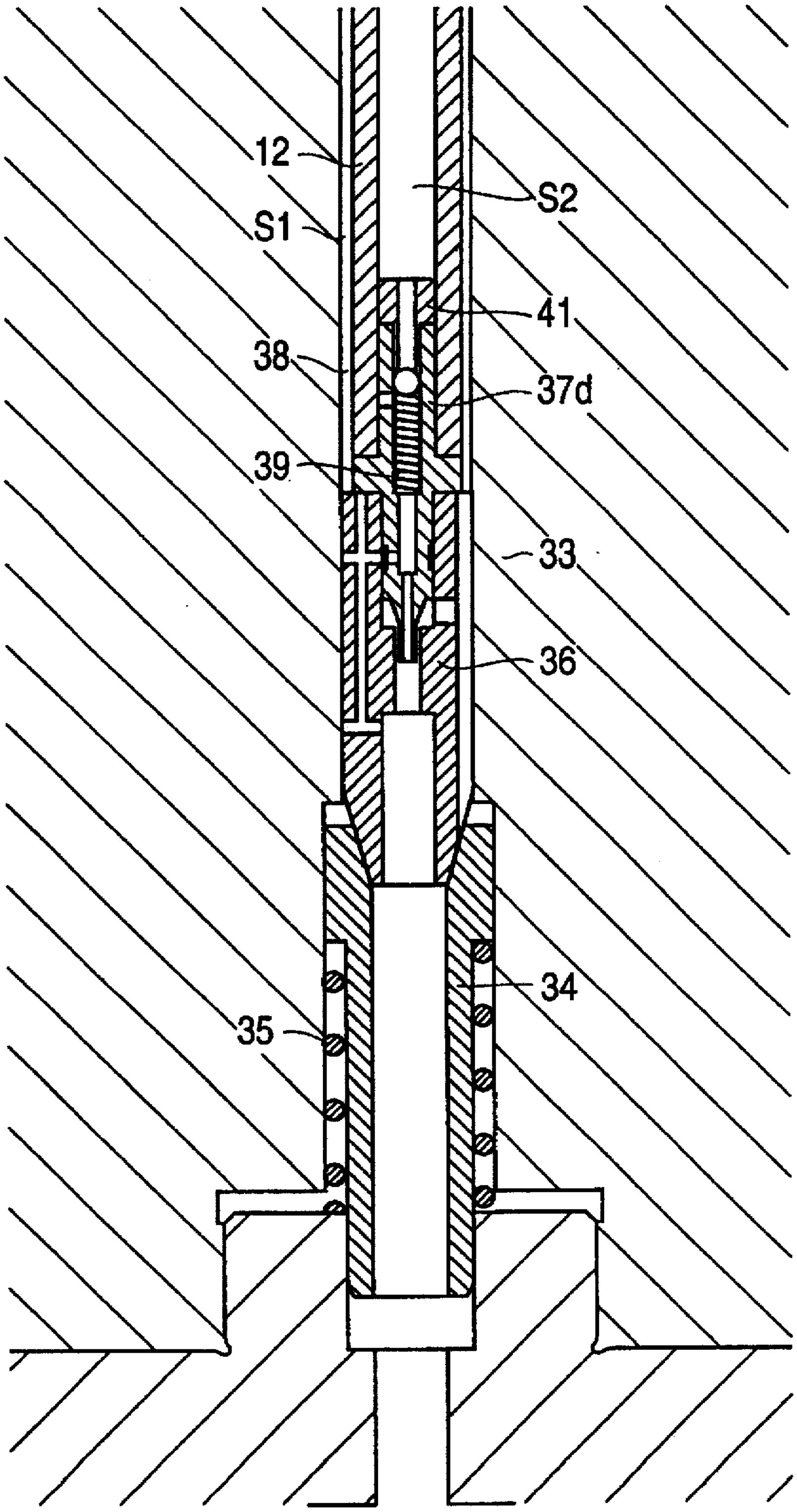
FIG. 12 is a longitudinally sectional view showing major parts according to an improved example of the same preferred embodiment.

FIG. 12 is a longitudinally sectional view showing major parts of another improved embodiment of the abovementioned device. In this preferred embodiment, a diameter-reduced part 37*d* is formed on the upper part of the nozzle rear member 37 as shown in the same drawing, and an appointed stop valve 38 is provided there. A detailed description is given below. That is, a compression spring 39 is mounted in the inner hole of the diameter-reduced 37*d*, and at the same time a ball 40 which is caused to be displaced downward inside the inner hole of the diameter-reduced part 37*d* against the elasticity of this spring 29 is provided. Furthermore, a cylindrical member 41 which closes the supply path s2 by a close contact of a ball 40 is fitted to and inserted into the diameter-reduced part 37*d*, and the diameter-reduced part 37*d* is fitted to the lower end of the inner pipe 12.

Figure 13:
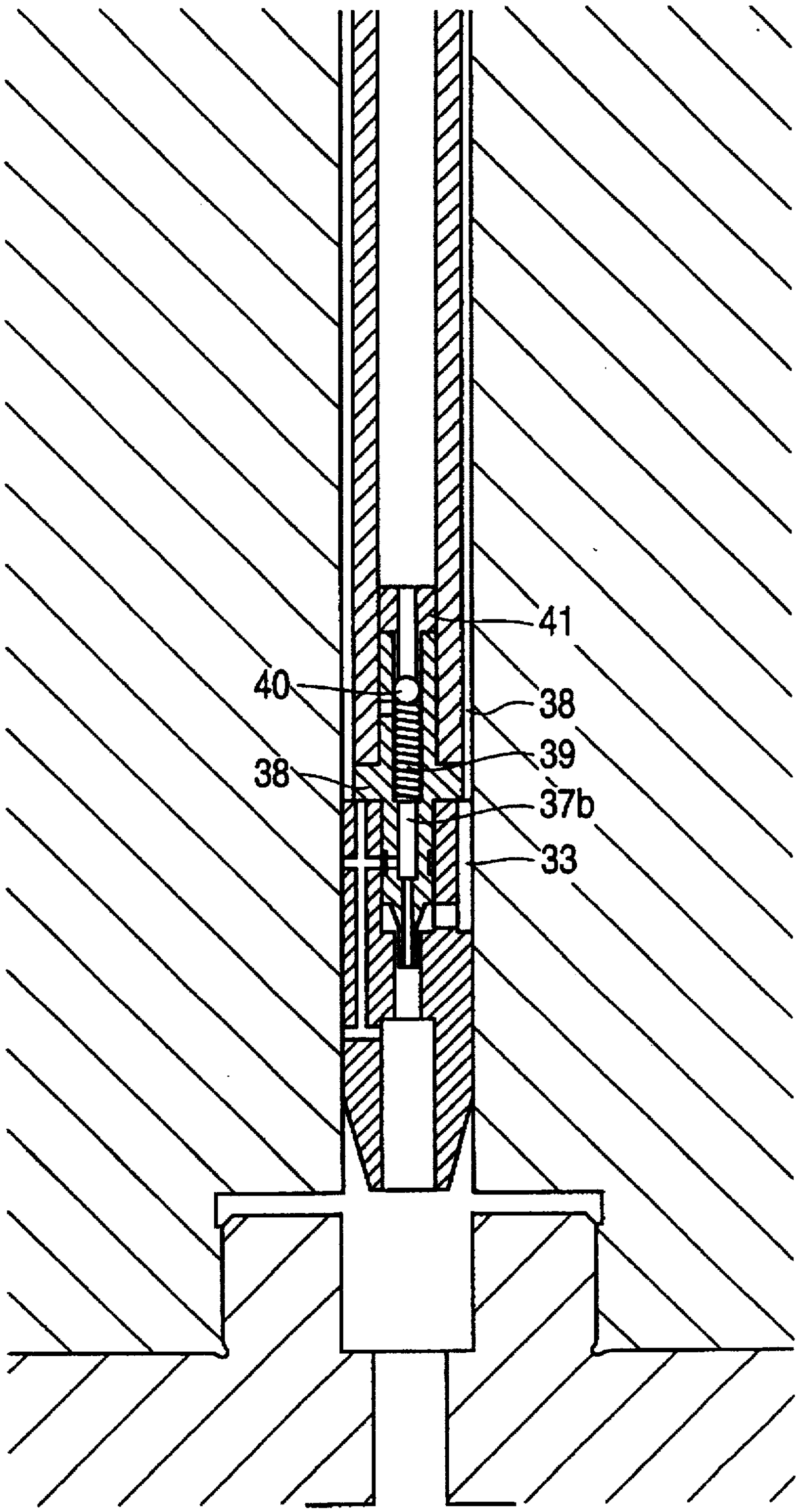
FIG. 13 is longitudinally sectional view explaining the actions of the same improved example.

A description is given of the improvement embodiment. When coolant is not supplied, the ball 40 is brought into close contact with the lower end of the cylindrical member 41, as shown in FIG. 12, by a force of a spring 39, whereby the supply path s2 is stopped. On the other hand, when coolant is supplied, the ball 40 is displaced downward as shown in FIG. 13, by pressure of the coolant, and the coolant is supplied toward the front edge of the inner hole 37*b* of the nozzle rear member 37 via the periphery of the ball 40 and the existing portions of the spring 39.

When the coolant is interrupted while the same is being supplied, the ball 40 is immediately returned to a state shown in FIG. 12 by a force of the spring 39, thereby causing the supply path s2 to be stopped.

Thus, coolant is supplied without any hindrance as necessary and is immediately stopped without leakage of the residual coolant when the coolant is not necessary. At this time, it is made more reliable in view of preventing coolant from leaking that a stop valve 38 is provided in the vicinity of the mist generating device 33.

Figure 14:
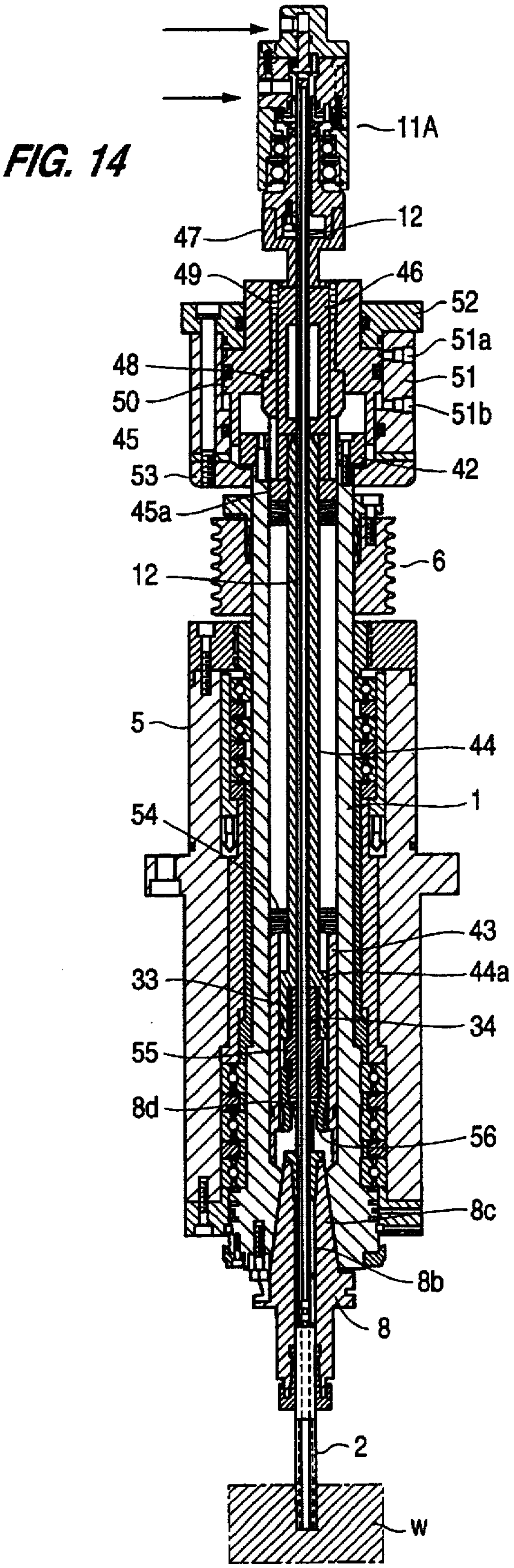
FIG. 14 is a longitudinally sectional view showing the spindle head portion according to a second preferred embodiment of the invention.

A description will be given of a second preferred embodiment of the invention. FIG. 14 is a longitudinally sectional view showing a spindle head portion.

As shown in the drawing, a tool holder 8 which is mounted and removed by an automatic tool changer is mounted at the front edge of the spindle 1 via a tapered shank 8*c*.

A path 8*b* of the tool holder 8 is provided from the rear end of pull stud 8*d* to the tool 2 mounting portion.

42 is a cylinder engaging member fixed by a bolt at the rear edge of the spindle 1, 43 is a guide cylindrical member internally fitted into the front edge of the inner hole 1*a* of spindle 1, and 44 is a draw bar internally inserted into said member 43 so as to be slidably displaceable.

An extension rod 45 equipped with a flanged portion 45*a* is connected to and fixed at the rear edge of the draw bar 44, wherein a ring member 46 is outwardly fitted to said extension rod 45, and at the same time a thrust receiving member 47 is extendably fixed by a bolt at the rear end face of said ring member 46.

48 is a piston supporting cylinder which is fitted to the outer circumference of said extension rod 46 rotatably around the center line of the same extension rod 46 via a bearing 49 attached to the thrust receiving member 47, and a staged piston 50 is attached to the periphery thereof.

51 is a cylinder member which surrounds said piston 50, and the same has an annular cylinder cover fixed at the upper face thereof with a bolt and has an engaging ring member 53, which stops the displacement in the spindle 1 direction by said cylinder engaging member 42, at the lower end face thereof, wherein 51*a* and 51*b* are an inlet and an outlet of a pressurized fluid.

54 is a disk spring which is compressibly overlapped between the upper end of the guide cylindrical member 43 and the flange portion 45*a* of said extension rod 45.

55 is a staged clamp member supporting cylinder which is fixed at the front end of said draw bar 44, and a clamp member 56 which is guided on the inner circumference of the guide cylindrical member 43 is engaged with and attached to the outer circumference of said supporting cylinder.

Thus, an inner pipe 12 is provided in the center hole of the draw bar 44 and in the center hole of the extension rod 45 and thrust receiving member 47. The outside and inside of the wall face of said inner pipe 12 are made a supply path corresponding to the abovementioned supply paths s1, s2, and furthermore a mist generating device 33, sliding cylindrical member 34 and their related components are mounted in the center hole of the clamp member supporting cylinder 55. In addition, as in the abovementioned preferred embodiment, a rotary joint 11A is connected to the mist generating device 33 by an air supply path and a coolant supply path.

In the above preferred embodiment, mist m is jetted from the front edge of a tool 2 as in the first preferred embodiment and brings appointed effects.

A tool holder 8 is chucked and unchucked in such a state where coolant is stopped.

At this time, if a pressurized fluid is supplied in one of the inlet and outlet portion 51*a*, the piston 50 and drawn bar 44 are caused to move to the front edge of the spindle 1 to cause the clamp member supporting cylinder 55 to push out the tool holder 8. Simultaneously, the clamp member 56 releases the pull stud 8*d*, whereby the tool holder 8 is separated from the spindle 1.

Contrarily, if a pressurized fluid is supplied from the other inlet and outlet port 51*b*, the respective components act reversely of the above, whereby the clamp member 56 chucks and pulls in the pull stud 8*d* of a tool holder 8 inserted into the front edge of the spindle 1 by an automatic tool changer, etc., and the tool holder 8 is tightly fixed at the spindle 1 as shown in FIG. 14.

Figure 15:
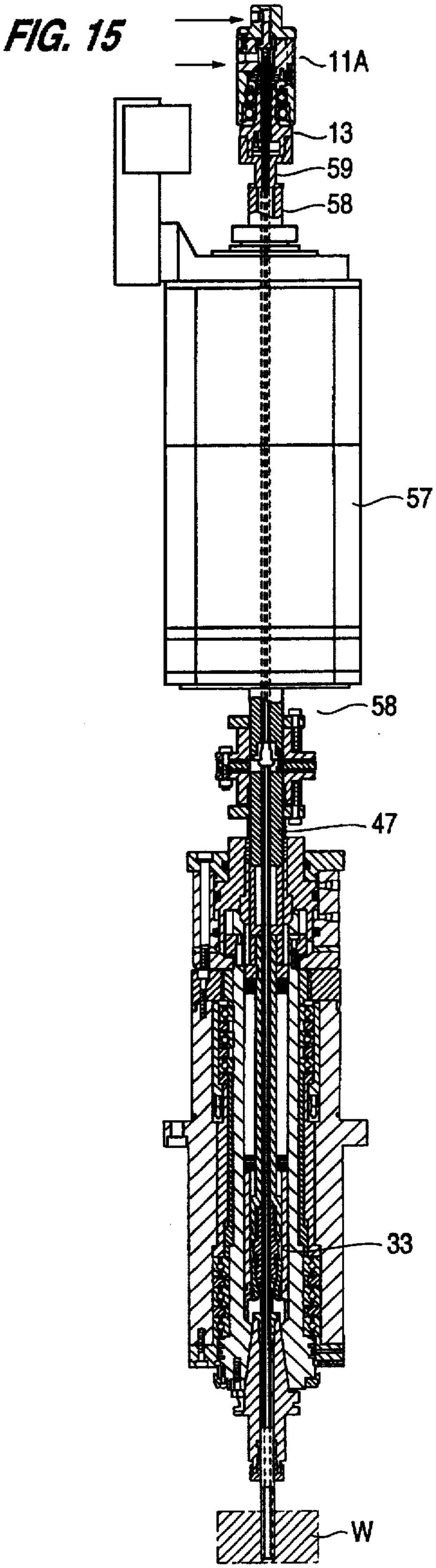
FIG. 15 is a longitudinally sectional view showing the spindle head portion according to a modified example of the same embodiment.

The abovementioned preferred embodiment may be modified as shown in FIG. 15. That is, the thrust receiving member 47 is extended upward and the lower end of the rotating shaft 58 of a motor 57 is connected to said thrust receiving member, wherein an axial cylindrical member 13 of the rotary joint 11A is fixed at the upper end of said rotating shaft 58 via said extending member 59. At this time, a supply path corresponding to said supply paths sl, s2 is provided at the center part of the rotating shaft 58 or the like in order to connect the rotary joint 11A to the mist generating device 33.

With this modified embodiment, mist m is able to be supplied to the machining part of a workpiece w as in the respective embodiments, and the spindle 1 is caused to rotate integrally with the rotating shaft 58.

What is claimed is:

1. A spindle device for a machine tool having a tool holder, the spindle device being characterized in that two supply path systems are provided in order to separately supply air and liquid into a spindle, and a mist generating device which mixes air and liquid supplied through these supply paths and jets mist is provided in an end of the spindle adjacent to the tool holder, or in the tool holder.

2. A spindle device for a machine tool having a tool holder, the spindle device being characterized in that two supply path systems are provided in order to separately supply air and liquid into a spindle, and a mist generating device which mixes air and liquid supplied through these supply paths and jets mist is provided in an end of the spindle adjacent to the tool holder, or in the tool holder.

3. A spindle device for a machine tool having a tool holder, the spindle device comprising:

a spindle having an inner opening and an end adjacent to the tool holder;

an inner pipe positioned in the inner opening, the inner pipe having an outer surface;

a space between the outer surface of the inner pipe and the inner opening for defining a liquid path, the inner pipe defining an air path;

a mist generating device for mixing air and liquid provided through said paths and for jetting mist, said mist generating device being positioned at the end of the inner opening of the spindle or in the tool holder, wherein said mist generating device comprises a front nozzle member and a rear nozzle member, the front nozzle member having a conical end surface, a central hole, and a body which is generally triangular in cross section, wherein said central hole comprises a rear part having a first diameter and a front part having a second diameter larger than said first diameter, the rear nozzle member has an end having a thin part, and the thin part of the rear nozzle member is positioned in the rear part of the central hole, with a slight space between the thin part and the front nozzle member.

4. A spindle device for a machine tool as set forth in claim 3, wherein a bypass path is provided in order to cause the air path to communicate with a space at a mist jetting side of said mist generating device, and an opening and closing valve mechanism which is arranged to be open when the pressure of the mist generated by the mist generating device is equal to or less than a fixed pressure level is provided along said bypass path.

5. A spindle device for a machine tool as set forth in claim 3, wherein a stop valve which is arranged to be closed when the pressure of liquid is equal to or less than a fixed pressure level is provided at a point immediately before the mist generating device, which is the terminal part of the liquid path.

* * * * *

UNITED STATES PATENT AND TRADEMARK OFFICE

CERTIFICATE OF CORRECTION

PATENT NO. : 5,676,506

DATED : October 14, 1997

INVENTOR(S) : Shinsuke Sugata

It is certified that error appears in the above-indentified patent and that said Letters Patent is hereby corrected as shown below:

Column 8, line 64, change the period to a comma and add:

--wherein a bypass path is provided in order to cause an air supply path to communicate with a space at a mist jetting side of said mist generating device, and an opening and closing valve mechanism which is maintained to be open when the pressure of the mist generated by the mist generating device is equal to or less than a fixed pressure level is provided along said bypass path.--

Column 9, line 4, change the period to a comma and add:

--wherein a stop valve which is maintained to be closed when the pressure of liquid is equal to or less than a fixed pressure level is provided at a point immediately before the mist generating device, which is the terminal part of the liquid supply path.--

Signed and Sealed this

Twenty-second Day of June, 1999

*Attest:*

Q. TODD DICKINSON

*Attesting Officer*

*Acting Commissioner of Patents and Trademarks*